March 6, 1928.

A. STOLTENBERG

VEGETABLE CUTTER

Filed Sept. 15, 1926

WITNESSES

INVENTOR
ADOLPH STOLTENBERG
BY
ATTORNEYS

March 6, 1928.  1,662,036
A. STOLTENBERG
VEGETABLE CUTTER
Filed Sept. 15, 1926  2 Sheets-Sheet 2
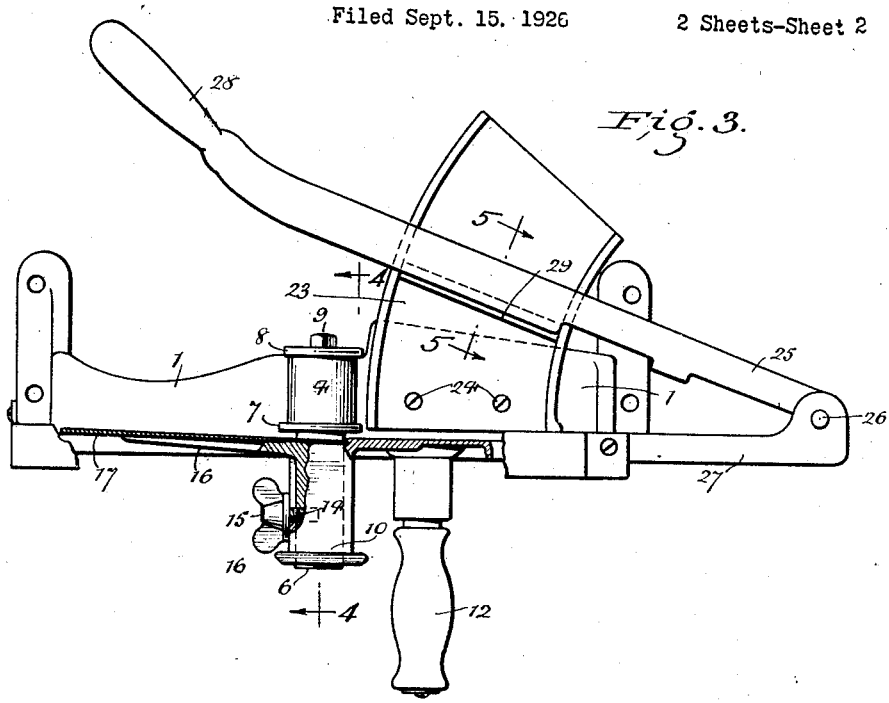
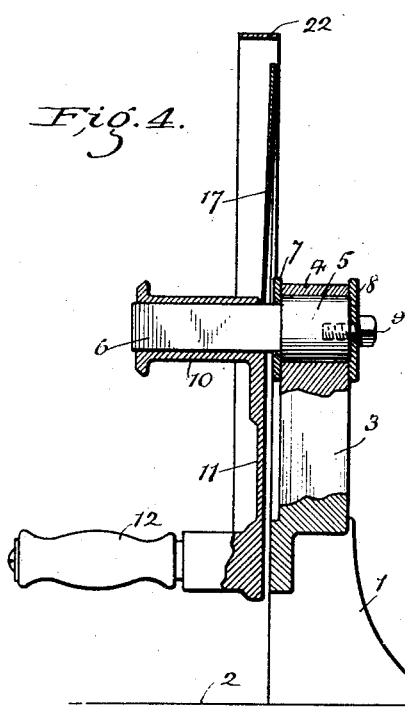
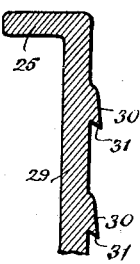
WITNESSES
INVENTOR
ADOLPH STOLTENBERG
BY
ATTORNEYS Patented Mar. 6, 1928.

1,662,036

UNITED STATES PATENT OFFICE.

ADOLPH STOLTENBERG, OF NEW YORK, N. Y.

VEGETABLE CUTTER.

Application filed September 15, 1926. Serial No. 135,608.

This invention relates to vegetable cutters, an object of the invention being to provide a machine which can be manually operated and easily adjusted so as to cut or slice vegetables as thin or thick as may be desired and perform the work quickly, neatly and efficiently without crushing the vegetables.

A further object is to provide a machine of this character which is capable of easy and fine adjustment to regulate the cut or slice and which has improved means for feeding the vegetables to the cutter.

A further object is to provide a machine of this character which can be manufactured and sold at a reasonably low price, which can be kept clean and sanitary under all conditions, and which will most efficiently perform the functions for which it is intended.

With these and other objects in view, the invention consists in certain novel features of construction and combinations and arrangements of parts, which will be more fully hereinafter described and pointed out in the claim.

In the accompanying drawings—

Figure 3 is a view mainly in top plan but partly in horizontal section;

Figure 4 is a view in section on the line 4—4 of Figure 3;

Figure 5 is an enlarged fragmentary view in section on the line 5—5 of Figure 3.

Figure 1:
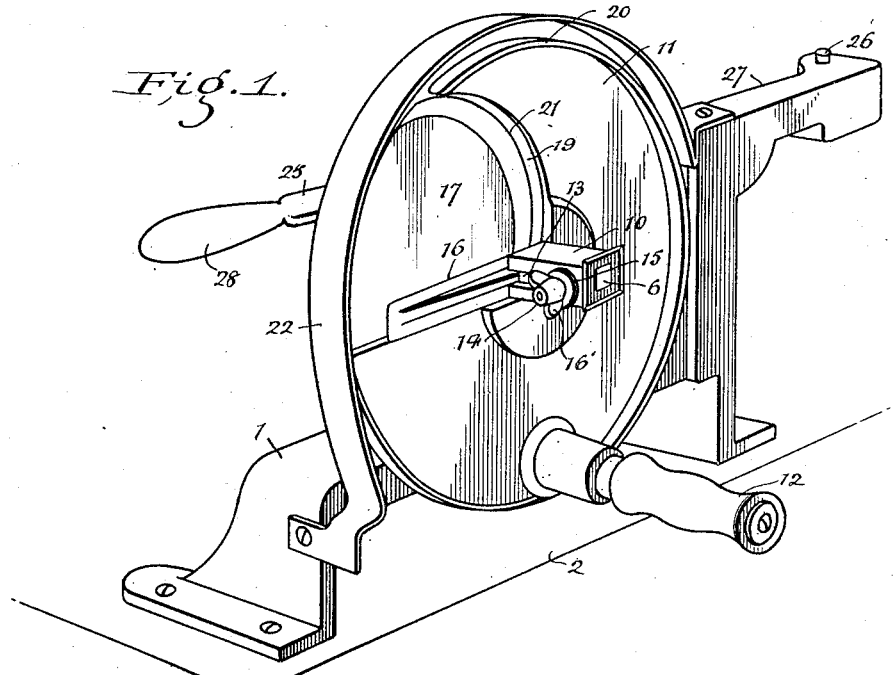
Figure 1 is a perspective view of my improved vegetable cutter.
Figure 2:
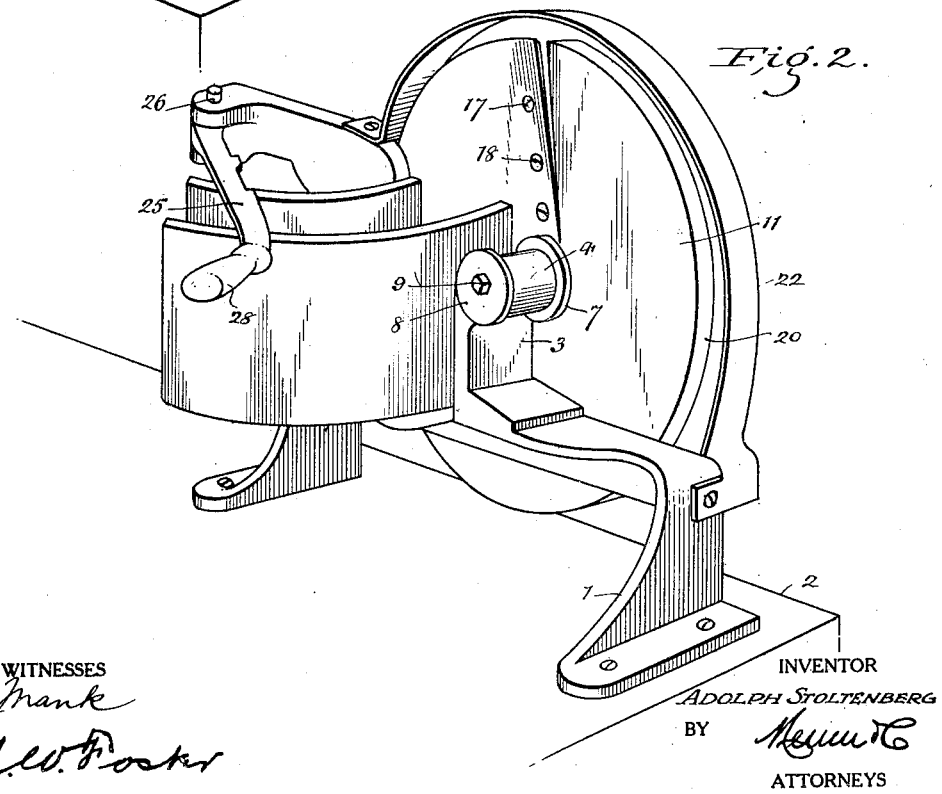
Figure 2 is also a perspective view of the cutter taken at a different angle.

1 represents the base of my improved machine which may be secured to a table, counter or other support 2 and which has fixed or integrally thereon an upwardly projecting bracket 3 having a cylindrical bearing 4 at its upper end.

This bearing 4 provides rotary mounting for the cylindrical end 5 of an angular shaft 6. Washers 7 and 8 normally receive the angular portion of shaft 6 and engage one end of the bearing 4, and the latter engage the opposite end of the bearing 4 and are secured in place by a tap screw 9 which is projected through the washers and screwed into the shaft, as clearly shown in Figure 4.

10 represents an angular sleeve which is fitted to the angular portion of shaft 8 and is adjustable thereon. This sleeve 8 supports a disk 11 having a swiveled crank handle 12 thereon to turn the same although it is obvious that motive power may be utilized to turn the disk, if desired.

The sleeve 10 is made with a longitudinal slot 13 and a threaded stud 14 fixed to the shaft 6 projects through this slot 13 and has a washer 15 and a wing nut 16' thereon to clamp the sleeve at any desired adjustment on the shaft.

An arm 16 is rigidly fixed to the shaft 6 and projects at right angles thereto. This arm 16 supports a cutter 17 which may be secured to the arm by screws 18 to allow the cutter to be removed and replaced as occasion may require.

This cutter 17 is segmental in form and corresponds in shape and relative size to a recess 19 in disk 11, the said disk being preferably formed with a flange 20 throughout its edge. In other words, the disk 11 is cut out or recessed so as to accommodate the cutter 17 which has a curved cutting edge 21 adapted to cut the vegetables presented thereto when the disk is rotated.

It is to be understood, of course, that the shaft 6, disk 11 and cutter 17 revolve as a unit, and that the width of the slice or cut is regulated by the relative positions of the cutter and the disk, and this adjustment is had by moving the sleeve 10 on the shaft 6 to laterally displace the disk relative to the cutter.

To prevent injury to the operator, a suitable guard 22 may be secured to the base 1 and extend over the upper portion of the disk and cutter.

The vegetables are fed to the cutter through a guide 23 which is in the form of a curved channel secured to the base 1 by screws 24 and made of proper proportions. 25 represents a lever which is pivotally connected at one end to a pin 26 on an arm 27 extending from the base 1, and this lever 25 extends across the top of the guide 23 and has a handle 28 at its free end. A follower 29 is fixed to or integral with the lever 25 and moves in the guide 23 to force the vegetables toward the cutter. This follower is formed on its working face with webs 30 having sharp lower edges 31 which prevent the vegetables from working upwardly in the guide.

The operation is as follows:

After the cutter is adjusted, or, rather, the disk is adjusted relative to the cutter, the vegetables are placed in the guide 23 and the operator grasps the handle 12 with one hand and handle 28 with the other. As he revolves the disk 11 and cutter 17 he moves the lever 25 toward the cutter, feeding the vegetables so that the cutter as it completes each revolution takes a slice off of the vegetables, and this slice may be as thin or as thick as desired. The base 1 is so constructed as to permit a receptacle or sheet of paper (not shown) to be located under the same to catch the falling slices of vegetables.

Various changes and alterations might be made in the general form of the parts described without departing from the invention and hence I do not limit myself to the precise details set forth but consider myself at liberty to make such changes and alterations as fairly fall within the spirit and scope of the appended claim.

I claim:

A vegetable cutter, including a base, a bearing on the base, a rotary cutting disk having mounting in the bearing, a vegetable guide fixed to the base having an open top and having concentric vertical walls spaced apart and curved horizontally, an arm projecting laterally from the base, a lever pivotally connected to the arm, and a follower on the lever between the vertical walls of the guide and movable in a horizontal plane concentrically with the curvature of said walls.

ADOLPH STOLTENBERG.